Aug. 23, 1938.   A. J. BALDAUF   2,127,711
HOLDER FOR PROOFREADING
Filed May 2, 1936   2 Sheets-Sheet 1
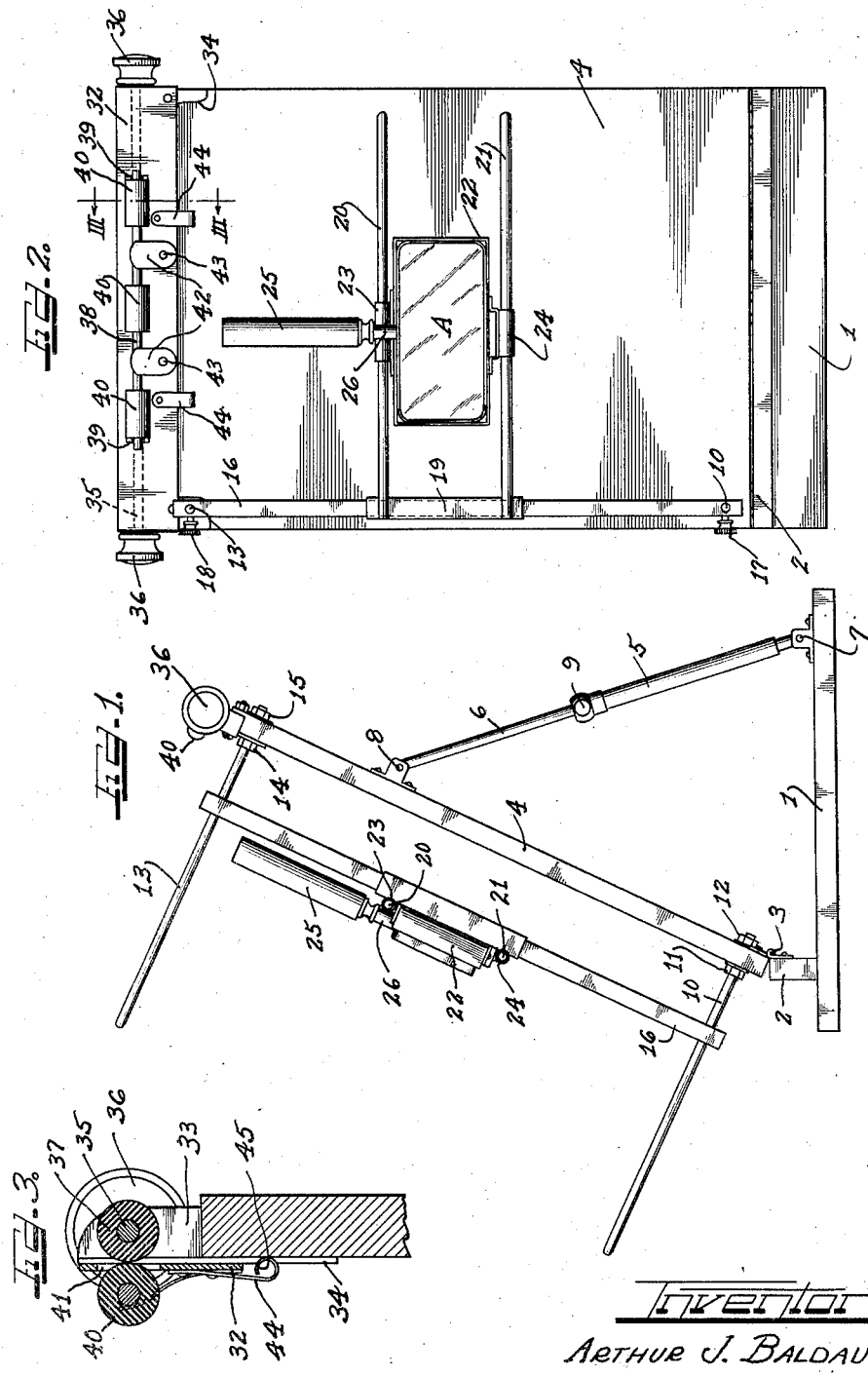
Inventor
ARTHUR J. BALDAUF.
by Charles W. Hills   Attys.

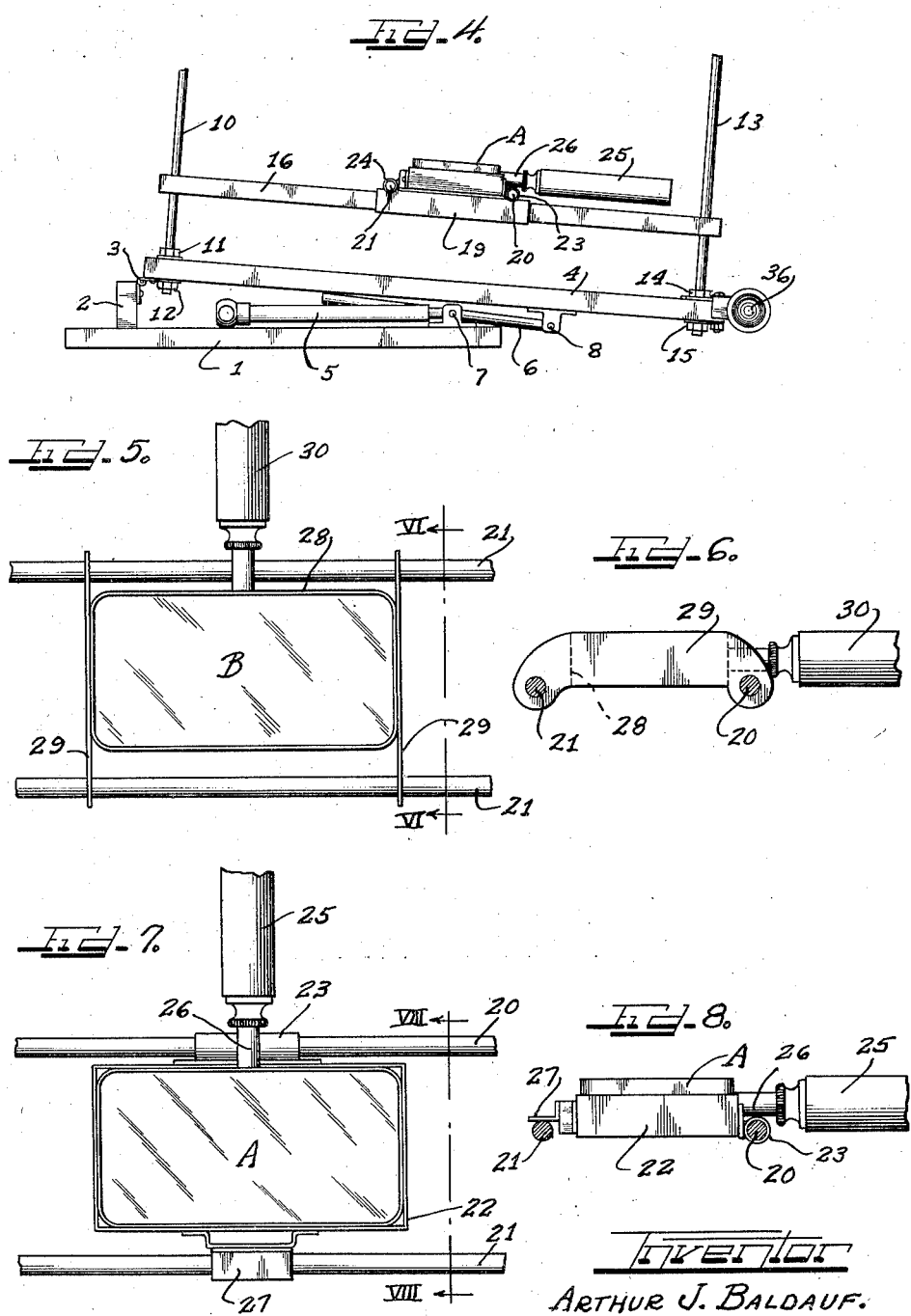

Patented Aug. 23, 1938

2,127,711

UNITED STATES PATENT OFFICE 2,127,711

HOLDER FOR PROOFREADING

Arthur J. Baldauf, Highland Park, Ill.

Application May 2, 1936, Serial No. 77,525

1 Claim. (Cl. 88—39)

The present invention relates to a holder for proof-reading utilizing a magnifying glass so supported as to be readily positioned over any part of the holder, without requiring the expenditure of time for moving it to any desired position for use.

The present invention is concerned with a holder for reading matter, particularly matter to be proof-read, wherein there is provided a magnifying glass so mounted as to be moved from place to place over the reading matter, or positioned in a certain position, and the reading matter moved under the glass to thereby reduce to a minimum sight-strain attendant on such proof-reading.

An object of the present invention is to provide a holder for proof-reading, wherein a magnifying glass is employed, and wherein the weight of the magnifying glass is utilized for securing it, by cramp or cantilever action, to a supporting bar, whereby the position of the glass and its carrier may be readily moved without loss of time.

Another object of the present invention is to provide a holder for proof-reading so constructed that the matter to be read may be passed underneath a magnifying glass.

A further object of the present invention is to provide, in a holder for proof-reading, a supported magnifying glass, wherein the weight of the glass and its supporting structure is utilized to act with cantilever or cramp action to secure the glass in desired position over the reading matter.

A still further object of the present invention is to provide a holder for proof-reading, wherein a bed is hinged to a base so as to be angularly adjusted with respect to the base, to suit the convenience and comfort of the reader.

Another object of the present invention is to provide, in a holder for proof-reading, means for focusing a magnifying glass on reading matter, and locking the means in proper position, together with means whereby the glass itself may be moved crosswise as well as lengthwise of the bed, thus maintaining the focus constant for all positions occupied by the glass.

The invention contemplates as a further object the provision of a carriage for supporting a magnifying glass in a holder for proof-reading, wherein the glass may be very readily moved from place to place and secured in desired position solely by a cantilever or cramp action, without the use of set screws or other positive fastening means.

A still further object of the present invention is to provide novel means for advancing reading matter, to be proof-read, underneath a magnifying glass.

Generally speaking, the present invention contemplates a base to which is hingedly connected a bed adapted to be secured in adjusted angular relationship with respect to the base. A bar is supported along one side margin of the bed by means of posts rising from the bed adjacent the corners of said side, which bar carries a rider slidable along the bar and which rider carries a carrier on which is supported a magnifying glass, the construction being such that once the glass having been focused, it may be moved lengthwise or sidewise of the bed and secured in desired position by releasing hold of it, whereupon by cantilever or cramp action, the carriage is secured to the carrying means and the rider is secured to the bar.

The above, other and further objects of the present invention will be apparent from the following description and accompanying drawings.

Embodiments of the present invention are illustrated in the accompanying drawings and the views thereof are as follows:

Figure 1 is a side elevational view of the holder for proof-reading, adjusted with the bed in inclined relationship to the base, and constructed in accordance with the principles of the present invention.

Figure 2 is a front elevational view of the holder illustrated in Figure 1, with the bed at right angles to the base.

Figure 3 is an enlarged vertical sectional view, taken substantially in the plane indicated by the line III—III of Figure 2.

Figure 4 is a side elevational view of the illustrated form of holder, showing the same in collapsed position when not in use.

Figure 5 is a fragmental elevational view of one form of carriage for mounting the magnifying glass on the carrier.

Figure 6 is a sectional view taken substantially in the plane indicated by the line VI—VI of Figure 5.

Figure 7 is a view similar to Figure 5, showing another form of carriage for the magnifying glass.

Figure 8 is a sectional view taken substantially in the plane indicated by the line VIII—VIII of Figure 7.

The drawings will now be explained.

The illustrated form of holder consists of a base 1, near the front edge of which is secured a spacer member, and to which is hinged, by means of hinges indicated generally at 3, a bed 4. The bed 4 is adapted to be swung from an upright position perpendicular to the base 2 to substantially the inoperative position shown in Figure 4.

For securing the bed 4 in adjusted angular relation with respect to the base 1, adjusting means are employed. The adjusting means herein illustrated comprise telescopic members 5 and 6, the former of which is pivoted at 7 to the base, and the latter of which is pivoted at 8 to the rear of the bed 4. As illustrated, the part 6 is adapted to enter the part 5 in telescopic arrangement and to be retained in relatively adjustable position by means of a set screw 9. Thus, by the means just described, the bed 4 may be adjusted angularly to suit the convenience and comfort of the proof-reader.

Secured to one lower corner, the lower left-hand corner as observed in Figure 2, is a post 10 which is fastened in position by means of nuts 11 and 12 threaded on to the end of the post on each side of the bed 4 to thus secure the post in position. Secured in the upper left-hand corner, viewing the holder in Figure 2, is another post 13 secured by like nuts 14 and 15. For sliding along the posts 10 and 13, a bar 16 is provided. This bar is apertured near its ends to pass over the posts, and is provided with set screws 17 and 18 to secure the bar 16 in adjusted relationship along the posts 10 and 13 when the bar has been moved to such position as to properly focus the magnifying glass supported by it. The bar 16 may be of any suitable shape, being herein illustrated as rectangular in cross-section.

Slidable along the length of the bar 16 is a rider 19 which surrounds the bar 16 and which has projecting from one side thereof parallel rods 20 and 21, which rods constitute carrier means. The ends of the rods remote from the rider 19 are unsupported and free so that the rods may bend slightly, or have a tendency to bend, due to the weight of the supported magnifying glass.

Slidable along the carrier means is a carriage for a magnifying glass. The form of carriage illustrated in Figures 2 and 7 comprises a frame member 22 of proper shape to receive the glass, designated generally at A, and which carriage has formed as a part of it a cylindrical sleeve 23 to receive the rod 20, and another similar sleeve 24, on its opposite side, to receive the rod 21. The glass A is rectangular in elevation, and is provided with a handle 25. The portion of the carriage 22 adjacent the rod 30 is notched to receive the shank 26 of the glass handle, and thus prevents accidental displacement of the glass when in use.

The form of carriage illustrated in Figure 7 is the same as that described with reference to the one illustrated in Figure 2, with one exception, to-wit, the sleeve 24 is replaced by an angle member 27 suitably riveted to the carriage and which, when the device is in use, is adapted to ride on the rod 21 of the carrier means.

The form of carriage illustrated in Figures 5 and 6 comprises a frame 28 which is also the frame of the glass. Attached to the frame 28 are metallic straps 29 having at their ends apertures to receive the rods 20 and 21. In this form of magnifying glass, the glass B is provided with a handle 30 for movement of the glass along the carrier means.

The carriage illustrated in Figure 2 is applied over the rods 20 and 21 by causing the sleeves 23 and 24 thereof to surround the rods from their outer ends, whereupon the carriage is slid towards the rider 19. The form of carriage illustrated in Figure 7 is applied to the carrier means by applying the sleeve 23 thereof about the rod 20, with the angle member 27 resting against the rod 21.

The carriage illustrated in Figures 5 and 6 is applied to the free ends of the rods 20 and 21 by slipping the apertured ends of the end pieces 29 over the rods, as clearly illustrated in Figure 5.

In the drawings, the handles of the glasses are shown as extending upwardly. It is of course to be understood that the glasses may be applied to their carriages with the handles extending downwardly.

At what is shown in the drawings as the upper end of the bed 4 is provided a header comprising a member 32 of metal which extends across the top of the bed in spaced relation thereto, as may be observed in Figure 3, and which is fastened thereto by the same being turned back forming brackets 33 which are secured, by any suitable means, to the side margins of the bed 4. For spacing the header 32 from the surface of the bed, filler members 34 are employed. These consist of narrow strips of metal or other material inserted between the face of the bed 4 and the inner surface of the header 32, as may be readily observed in Figure 3, and which inserts are narrow to provide a space between them, through which paper may pass over the face of the bed 4.

For moving long lengths of paper, such as galley proofs, over the bed 4, advancing means are provided. The means herein illustrated consist of a shaft 35 which is journaled in the brackets 33, and which at its outer ends carries knobs 36 for rotating it manually. The shaft 35 in its length is provided with separated rollers, one of which is illustrated at 37 in Figure 3. These rollers are preferably axially spaced.

Cooperating with the shaft 35 and its supported rollers 37, a floating shaft 38 is provided. This shaft is in length less than the length of the header 32, as may be observed in Figure 2, and is supported in parallel relationship to the shaft 35 by upturned U-bearing members 39 which are struck up from the header 32. Axially spaced along the floating shaft 38 are rollers 40 arranged to register with the rollers 37 on the shaft 35. The header 32 is, of course, provided with open spaces 41 (Figure 3), through which the rollers 40 may project and cooperate with the rollers 37 on the shaft 35 to between them grip and advance lengths of paper or other matter to be read.

The floating shaft 38 is maintained in position by means of spring clips 42 secured to the header 32 by means of bolts 43 or like fastening means. It will thus be observed that the shaft 38 may be readily removed from its position in the header for repair or replacement.

In order to hold sheets of paper against the bed 4, spring clips 44 are attached to the header 32 and project below its lower end and contact the surface of the bed 4. Preferably, the extremities of these members are inturned as at 45 (Figure 3), so as not to tear the paper inserted thereunder.

In the use of the present apparatus for reading proofs on long sheets of paper, such as galley proofs, a galley sheet is inserted between the rollers 40 and 37 from the lower margin of the header 32. The operator then adjusts the bed 4 at a convenient and comfortable angle for proofreading and then focuses the magnifying glass on the proof by loosening the set screws 17 and 18 and moving the bar 16 towards or away from the bed 4 until the proper focus is reached, whereupon the set screws are tightened. In this manner, the focus of the magnifying glass is constant, whatever its position is over the bed 4. The operator then grasps the handle of the magnifying glass and moves it upwardly, downwardly or sidewise to overlie the first lines of the proof.

It is possible to move the rider 19 along the bar 16, as such casting of the handle of the glass and pressure applied to the handle by the operator in moving it to desired position will loosen the rider 19 on the bar 16 and enable a sliding movement along the bar. When pressure is released on the handle, then, because of the weight of the glass on the carrier means, the rider 19 is canted slightly so as to make a cantilever or cramped engagement with the bar 16, thus affixing the rider 19 in adjusted position with respect to the bar 16. The reader then reads the proof through the glass, moving the glass, if necessary, along the carrier means, which is easily accomplished by grasping the handle and moving the glass in the desired direction.

After the lines visible through the glass in its then adjusted position have been read, either or both of the knobs 36 may be grasped and the shaft 35 rotated to move the proof upwardly on the bed 4 to present a new series of lines underneath the magnifying glass, whereupon the operation of proof-reading is repeated. This is continued until the complete galley proof is properly read and corrected.

In the event that a single sheet is to be proofread, it is engaged underneath the spring clips 44, simply by pushing its upper margin underneath these clips, and adjusting the glass in proper position, as to focus, and for reading purposes.

When the proof-reading operation has been completed, the holder may be collapsed to the position shown in Figure 4, thus reducing its size for putting it aside or for storage.

The holder is collapsed to the position of Figure 4 by loosening the set screw 9 and removing the member 6 of the telescoping members from within the member 5, whereupon the bed 4 is folded against the base, as may be readily observed.

By reference to Figure 4, it will be observed why it is preferable to utilize the spacer member 2 in the construction of the present invention. It is obvious that the purpose of the spacer member 2 is to raise the end of the bed 4 a sufficient distance from the base 1 so that the parts 5 and 6 of the telescoping means may be accommodated between the upper surface of the base and the rear surface of the bed 4 when the apparatus is collapsed.

It will readily be observed that the positioning of the magnifying glass lengthwise or crosswise of the bed 4 is accomplished in a very simple manner. By reason of the construction of the apparatus of the present invention, the rider 19 is clamped against the bar 16, by reason of the weight of the glass on the carrier means, and also the glass is positioned along the carrier means by the same clamping or cantilever action. The rods 20 and 21 are of such characteristics as to be strong enough to carry the magnifying glass, and yet at the same time possessing a sufficient tendency to bend so as to clamp the glass in adjusted position along the rods.

By reason of the cantilever or clamping securement of the rider to the rod 16 and the glass to the carrier means, the glass may be very quickly adjusted over any position or portion of the bed 4, as there are no set screws or other means to be manipulated.

The invention has been described herein more or less precisely as to details, yet it is to be understood that the invention is not to be limited thereby, as changes may be made in the arrangement and proportions of parts, and equivalents may be substituted, without departing from the spirit and scope of the invention.

The invention is claimed as follows:

A proof-reader's work support including a base adapted to rest on a horizontal surface and a flat bed hinged to said base for angular adjustment to convenient inclined position; means for securing said bed in angular adjustment; posts perpendicular to said bed secured thereto adjacent the two corners of one side margin of the bed; a bar slidable on said posts in parallel relation to said bed; means for securing said bar in desired position on said posts; a slide movable along said bar and having extended bearing engagement therewith; two rods secured at similar ends to said slide and extending across said bed from side to side thereof and parallel thereto and with their other ends free and unsupported; and a carriage slidable along said rods for supporting a magnifying glass and having a part encircling one of said rods; a magnifying glass in said carriage; the construction being such that when the bed is in inclined position the weight of the glass, carriage and rods will tend to tilt the slide with respect to said bar to frictionally lock the slide to the bar, and the weight of the carriage and glass will tend to tilt the carriage with respect to the rods to frictionally lock the carriage to the rods.

ARTHUR J. BALDAUF.